Figure 1:
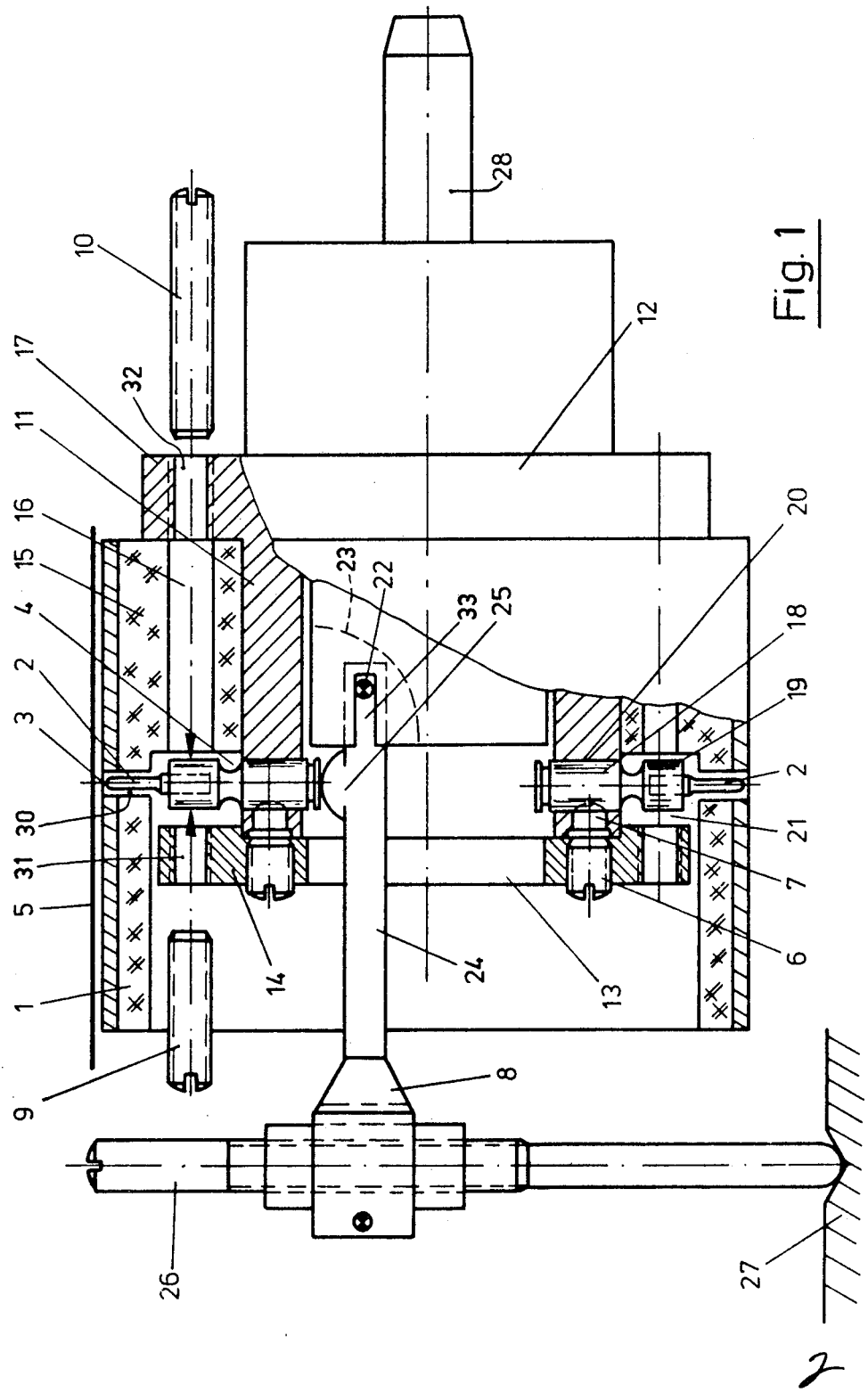

United States Patent [19]

Hinz et al.

[11] 4,101,908
[45] Jul. 18, 1978

[54] ADJUSTABLE MOUNT FOR ELECTROSTATIC PRINTER STYLUS WITHIN CYLINDRICAL PRINTING ROLLER

[75] Inventors: Hans-Dieter Hinz, Tornesch; Ulf Rothgordt, Norderstedt; Franz Schinke, Hamburg, all of Fed. Rep. of Germany

[73] Assignee: U.S. Philips Corporation, New York, N.Y.

[21] Appl. No.: 811,613

[22] Filed: Jun. 30, 1977

[30] Foreign Application Priority Data

Aug. 4, 1976 [DE] Fed. Rep. of Germany ....... 2635052

[51] Int. Cl.² ............................................. G01D 15/16
[52] U.S. Cl. .................................. 346/139 C; 346/155
[58] Field of Search ................. 346/139 R, 139 C, 155

[56] References Cited

U.S. PATENT DOCUMENTS

| 2,581,616 | 1/1952 | Young | 346/139 R |
| 2,591,138 | 4/1952 | Cooley | 346/139 C |
| 3,816,839 | 6/1974 | Honda et al. | 346/139 C X |
| 3,846,802 | 11/1974 | Kyotani et al. | 346/139 C X |

*Primary Examiner*—George H. Miller, Jr.
*Attorney, Agent, or Firm*—Frank R. Trifari; Robert S. Smith

[57] ABSTRACT

An electrode stylus which is arranged in an aperture of a rotatable printing roller is secured in a cylindrical insert of the roller by means of an electrode holder. The electrode holder comprises a constriction in the center, so that it is sub-divided into an adjusting portion which supports the electrode and which can be slightly bent, by means of adjusting screws, transversely of the jacket surface of the roller, and a fixing portion which can be fixed in an aperture in the insert by means of a fixing screw. The adjustment of the height of the stylus is effected, after the loosening of the fixing screw, by an arm which can be inserted into the insert and which is radially pivotable therein relative to the roller axis. Microscopic adjustment of the electrode stylus in the tangential as well as the radial direction relative to the roller is thus possible.

4 Claims, 2 Drawing Figures

ADJUSTABLE MOUNT FOR ELECTROSTATIC PRINTER STYLUS WITHIN CYLINDRICAL PRINTING ROLLER

The invention relates to an electrostatic printer, comprising a rotatable, cylindrical printing roller having an electrically non-conductive jacket which is provided with at least one aperture in which a stylus electrode is arranged.

A printer of this kind is known, for example, from German Offenlegungsschrift No. 24 28 632. During the recording, the stylus electrode slides under pressure over a record carrier which is pulled, while a thin air cushion is being formed, over an angular region of the roller. In order to obtain sufficiently accurate matrix recording, the stylus electrodes must project 100 $\mu$m from the roller jacket. This adjustment must be accurate within $\pm$ 2.5 $\mu$m. In view of the line spacing of the matrix recording, it is also necessary to adjust the centres of the recording ends of the stylus electrodes in the axial direction of the roll within $\pm$ 1 $\mu$m in the plane of rotation. In order to obtain a proper print image, therefore, accurate adjustment of the electrodes in the printing roller is necessary.

The invention has for its object to provide a printer in which independent fine adjustment of the stylus electrodes in two directions is possible. It is also an object of the invention to construct the printer so that, when a stylus electrode is replaced by a new stylus electrode, the same electrode position is obtained, so that it is not necessary to readjust the electrodes which have not been replaced.

To this end, the printer in accordance with the invention is characterized in that each stylus electrode is provided on an end of a rod-shaped electrode holder and freely projects through the associated aperture in the jacket of the printing roller, said jacket accommodating an insert of electrically conductive material in the form of a hollow cylinder comprising a bottom, apertures which serve to accommodate the electrode holders being recessed in the cylindrical wall thereof, said electrode holders being sub-divided into an adjusting portion which projects outside the cylinder wall and which supports the stylus electrode, and a fixing portion which is axially movable in the associated aperture and which is to be fixed by means of a fixing device, the adjusting portion being displaceable transversely of the longitudinal direction of the electrode holder by means of a first adjusting device, while the electrode holder is displaceable in its entirety in its longitudinal direction by means of a second adjusting device.

In a further embodiment of the device in accordance with the invention, the electrode holder comprises a constriction at the area of the transition between the adjusting portion and the fixing portion, so that the adjusting portion can be slightly bent with respect to the fixed fixing portion, in the radial direction relative to the longitudinal axis of the electrode holder, by means of diametrically arranged adjusting screws. Adjustment of the stylus electrode in the axial direction of the printing roller is thus possible. For the radial adjustment of the electrode stylus, use is made of the second adjusting device which, in a further embodiment of the device in accordance with the invention, consists of an arm, one end of which can be axially inserted into a recess in the bottom of the insert, whilst its other end, projecting outside the cylinder of the insert, is secured to a threaded spindle so that its height is adjustable.

The device in accordance with the invention offers a special advantage in that, as a result of the use of thread of small pitch for the adjusting screws and the threaded spindle, microscopically accurate adjustment of the stylus electrodes can be achieved.

An embodiment of the device in accordance with the invention will be described in detail hereinafter with reference to the accompanying diagrammatic drawing.

Figure 2:
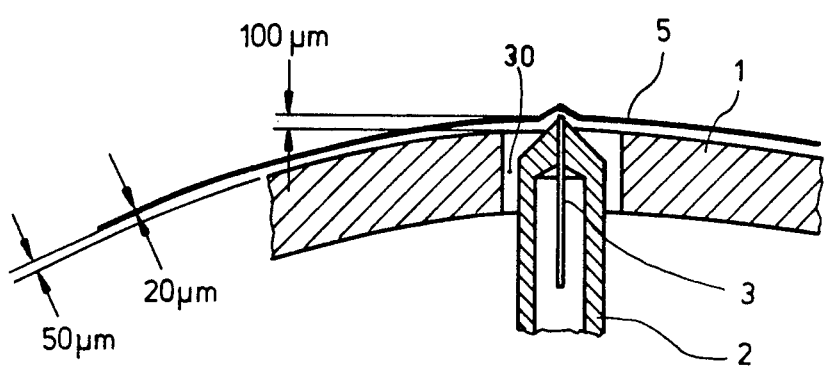

FIG. 1 is a longitudinal sectional view of a printing roller of an electrostatic printer in accordance with the invention, and FIG. 2 is a sectional view at an increased scale of a stylus electrode of the device shown in FIG. 1.

All parts of the electrostatic printer which are not directly necessary for a proper understanding of the invention have been omitted in the drawing. Therefore, FIG. 1 shows only the printing roller which comprises a shaft 28 which is journalled in known manner to be rotatable and axially displaceable in a housing of the printer (not shown). The shaft 28 is connected to a bottom 12 which constitutes an insert in conjunction with a hollow cylinder 11. This insert is accommodated in the insulating jacket 1 of the printing roller and is integral therewith. The cylindrical wall of the hollow cylinder 11 comprises a number of apertures 20 which corresponds to the required number of electrodes. The drawing shows two diametrically arranged electrodes, each of which is secured to one end of a rod-shaped electrode holder which consists of a fixing portion 18, secured in the aperture 20, and an adjusting portion 19 which supports the stylus electrode.

The stylus electrodes consist of a metal sleeve 42 and an SiC whisker 43 (see FIG. 2). The electrodes 2, 3 projects 100 $\mu$m from the jacket 1 of the printing roller through a comparatively wide aperture 30. This distance would have to be adjusted with an accuracy of $\pm$ 2.5 $\mu$m in order to achieve an accurate text image on a record carrier 5. During the rotation of the printing roller, the record carrier 5, consisting of a polyester foil having a thickness of 20 $\mu$m, slides over an air cushion having a thickness of 50 $\mu$m and is deflected slightly outwards thereby in the region of the electrodes 2, 3, so that between record carrier 5 and the electrode 2, 3 a force arises which ensures the accurate mechanical and electrical contact between the two elements which is required for the voltage-controlled, image-wise electrostatic recording.

The electrode holder 18, 19 is provided with a constriction 4 which is situated between the fixing portion 18 and the adjusting portion 19. This constriction 4 is formed so that, when the fixing portion 18 is fixed, the adjusting portion 19 can be slightly bent in all directions, radially relative to the axis of the electrode holder. The fixing portion has a diameter which is slightly smaller than that of the aperture 20, so that it is axially movable. It can be fixed by means of a fixing device which is formed by a fixing screw 6 with a pressure piece 7. The end which is remote from the bottom 12 is provided with an end plate 13 having a central aperture which comprises a collar 14 on the outer side. This collar 14 forms part of the boundary of an aperture 21 in which the adjusting portion 19 of the electrode holder is situated. This aperture is further bounded by a thickened portion 15 of the jacket 1, which also serves to secure the insert 11, 12.

A threaded bore 31 is provided in the collar 14 of the end plate 13. An adjusting screw 9 can be screwed into the said bore. Diametrically opposite this screw, a second adjusting screw 10 can be screwed into a threaded bore 32 in a projecting part 17 of the bottom 12; this second screw passes through a bore 16 in the thickened portion 15 of the jacket 1 and also reaches as far as the adjusting portion 19 of the electrode holder. Both adjusting screws thus diametrically act on the adjusting portion 19 of the electrode holder (arrows). Depending on the adjustment of the adjusting screws 9 and 10, forming a first adjusting device, the adjusting portion 19 can be displaced in the one or the other direction, perpendicularly to the axis of the electrode holder. Thus, the stylus electrode 2, 3 is also moved in these directions at the same time. If the pitch of the thread of the adjusting screws 9 and 10 is chosen to be very small, a microscopically small adjustment of the electrode in the plane of rotation can be achieved.

The adjustment of the electrodes 2, 3 in the radial direction is performed by a second adjusting device which consists of a threaded spindle 26 and an arm 24 which is provided on one end with a nut 8 which cooperates with the threaded spindle. The threaded spindle 26 bears on the bottom 27 of the printer housing, one end of the arm 24 being inserted into a recess 23 (denoted by a broken line) in the bottom 12, while the other end with the nut 8 projects outside the cylinder 11. In order to avoid rotation of the arm 24 about its longitudinal axis on the one hand and to enable rotation about an axis perpendicular to the longitudinal axis within the recess 23 on the other hand, the arm 24 is provided on its front end with laterally projecting pins 22 which engage with a suitable fit in the slots 33 which open into the recess 23. Only the front one of these slots, being oppositely arranged, is visible. The arm 24 is provided with a cam 25 on which the electrode holder 18, 19 freely bears initially. Due to the rotation of the spindle 26, the nut 8 rotates the arm 24 about the axis of the pins 22, so that the electrode holder 18, 19 is slid upwards or downwards. Depending on the pitch of the thread of the spindle 26, this movement can also be microscopically fine adjusted. After adjustment of the prescribed distance over which the electrode tip projects from the jacket 1 of the printing roller, the fixing screw 6 is tightened, so that the fixing portion 18 of the holder is fixed in the aperture 20 by way of the pressure piece 7.

After completion of this adjustment, the adjustment of the electrode tip within the plane of rotation is executed in the described manner by means of the adjusting screws 9 and 10. As soon as these adjustments have been completed, the second adjusting device can be removed.

If several electrodes are to be adjusted, the adjustment of each electrode is separately effected, each time in the upper position shown. This not only offers the advantage that the second adjusting device can have a simple construction, but also that the instruments used for the microscopically accurate adjustment can be maintained in the same position for all electrodes.

What is claimed is:

1. An electrostatic printer, comprising a rotatable, cylindrical printing roller, having an electrically non-conductive jacket which is provided with at least one aperture, a stylus electrode disposed in each aperture, a rod-shaped electrode holder carrying each said stylus electrode at one end thereof, each stylus electrode freely projecting through the aperture in which it is disposed, said jacket accommodating an insert of electrically conductive material in the form of a hollow cylinder comprising a bottom, each aperture which serves to accommodate a stylus electrode extending through the wall of said hollow cylinder being recessed in the wall of said hollow cylinder, each electrode holder including (a) an adjusting portion which projects outside the wall of said cylinder and which supports the stylus electrode and (b) a fixing portion which is axially movable in the aperture in which the stylus electrode carried by the electrode holder is disposed and which is to be secured by means of a fixing device, said adjusting portion being displaceable transversely of the longitudinal direction of the electrode holder by means of a first adjusting device, each said electrode holder being entirely displaceable in the longitudinal direction thereof by means of a second adjusting device.

2. A printer as claimed in claim 1 wherein each said electrode holder includes a constriction at the area of the transition between the adjusting portion and the fixing portion.

3. A printer as claimed in claim 1, characterized in that said first adjusting device consists of two diametrically arranged adjusting screws, each of said adjusting screws acting on one side on the printing roller and on the other side on the adjusting portion.

4. A printer as claimed in claim 1, characterized in that the second adjusting device consists of an arm, one end of which can be axially inserted into a recess in the bottom of the insert while its other end, projecting outside the cylinder of said insert is mounted on a threaded spindle so that its height can be adjusted.

* * * * *